United States Patent [19]

Witten et al.

[11] 3,903,094
[45] Sept. 2, 1975

[54] PIPERIDYL GLYCOLATES

[75] Inventors: Benjamin Witten; Jacob I. Miller; Gaston E. Dudley, all of Baltimore; Ronald J. Kassel, Bel Air; Omer O. Owens, Edgewood, all of Md.

[73] Assignee: The United States of America as represented by the Secretary of the Army, Washington, D.C.

[22] Filed: Dec. 17, 1962

[21] Appl. No.: 246,875

[52] U.S. Cl. ...... 260/293.82; 260/293.65; 260/999; 424/267
[51] Int. Cl.² .................................. C07D 211/00
[58] Field of Search.... 260/294.3 A, 293.82, 293.65

[56] References Cited
UNITED STATES PATENTS
2,816,895  12/1957  Ehrhart et al.................. 260/293.82

OTHER PUBLICATIONS
Abood et al., Arch. Int. Pharmacodyn., Vol, 120, pp. 186–200, Rm1a7.

Primary Examiner—Leland A. Sebastian
Attorney, Agent, or Firm—Nathan Edelberg; Robert P. Gibson; Kenneth P. Van Wyck

EXEMPLARY CLAIM

1. A member of the group consisting of compounds of the formula:

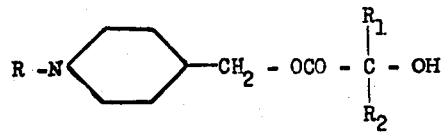

and nontoxic acid addition salts thereof, where R is a lower alkyl radical of 1–3 carbon atoms, $R_1$ is taken from the group consisting of the phenyl, cyclopentyl, and cyclohexyl radicals when $R_2$ is the phenyl radical and $R_1$ and $R_2$ taken together are the diphenylene radical.

9 Claims, No Drawings

PIPERIDYL GLYCOLATES

The invention described herein may be manufactured and used by or for the Government of the United States of America for governmental purposes without the payment to us of any royalty thereon.

This invention relates to a new series of glycolate esters of the general formula:

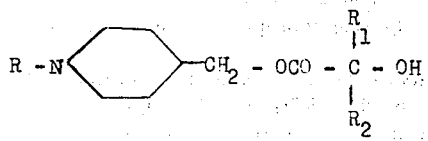

where R stands for a lower alkyl radical of 1–3 carbon atoms such as the methyl, ethyl, and propyl radicals, $R_1$ stands for the phenyl, cyclopentyl, and cyclohexyl radicals, $R_2$ stands for the phenyl radical and $R_1$ and $R_2$ taken together stand for the diphenylene radical.

The above esters and their acid addition salts such as the hydrochloride, sulfate, maleate, fumarate, tartrate, benzoate, phosphate and succinate, have been found to be useful as military psychotogens or incapacitating agents.

The term "psychotogen" used herein is a relatively new term. We will adopt the definition of this term as set forth in Col 6 of the patent to Biel U.S. Pat. No. 2,995,492 for use in this specification.

The starting material, 1-methyl-4-hydroxymethylpiperidine, is disclosed by Feldkamp et al., J. Am. Chem. Soc., 74:3831-3(1952).

In most cases the desired ester is prepared from the above alcohol and the appropriate methyl glycolate by transesterification in presence of a catalyst. This method is well known and is disclosed by the patent to Hill et al., U.S. Pat. No. 2,394,770.

In the case of the 1-methyl-4-piperidylmethyl diphenyleneglycolate, the appropriate alcohol and acid are reacted directly with the resultant water being removed by a Dean-Stark water separator.

The following examples are given to illustrate the invention.

EXAMPLE 1

1-Methyl-4-Piperidylmethyl Cyclopentylphenylglycolate

In a 300 ml. 3-neck, round bottom flask, which was equipped with a magnetic stirrer, reflux condenser, Dean-Stark water separator and a drying tube containing sodium hydroxide pellets, were placed 200 ml. of anhydrous xylene, 3.0 g. (0.0232 mole) of 1-methyl-4-hydroxymethylpiperidine and 5.45 g. (0.023 mole) of methyl cyclopentylglycolate. The stirred homogeneous mixture was heated to reflux and about 0.3 g. of sodium methoxide was added to the refluxing solution in approximately 0.1 g. portions during a 5½ hour period. The cloudy solution was then refluxed for an additional 2½ hours. The reddish colored solution was concentrated to about 75 ml. and cooled to 10° C. The cooled reaction mixture was extracted with three 50 ml. portions of 1 N hydrochloric acid. The hydrochloric acid extracts were combined and washed once with 25 ml. of xylene. The acid solution was then treated with sodium carbonate (7.5 g. in 75 ml. of water). The basic mixture was extracted with three 50 ml. portions of chloroform. To the aqueous phase was added 20 ml. of 15 percent sodium hydroxide solution and the mixture was then extracted with three 50 ml. portions of chloroform. The chloroform extracts were combined and washed with water until the pH of the water was about 8. The chloroform solution was dried over "Drierite". The dried chloroform solution was filtered and the solvent was removed under reduced pressure. The viscous yellow oily residue distilled at 107°–8° C. at $1 \times 10^{-3}$ mm. Hg to give 2.2 g. (27 percent) of the extremely viscous, light yellow oil.

Analysis: Calcd. for $C_{20} H_{29} NO_3$: C, 72.47; H, 8.82; O, 14.2 Found: C, 72.6; H, 8.8; O, 14.2.

EXAMPLE 2

1-Methyl-4-Piperidylmethyl Cyclohexylphenylglycolate

In a 100 ml. 3-neck, round bottom flask, which was equipped with a magnetic stirrer, reflux condenser, Dean-Stark water separator and a drying tube containing sodium hydroxide pellets, were placed 60 ml. of anhydrous n-heptane, 3.0 g. (0.023 mole) of 1-methyl-4-hydroxymethylpiperidine and 5.8 g. (0.023 mole) of methyl cyclohexylphenylglycolate. The stirred homogeneous mixture was heated to reflux and about 0.3 g. of sodium methoxide was added to the refluxing solution in about 0.1 g. portions during a 6 hour period. During this reaction time a solid preciptiate separated. In the Dean-Stark water separator was collected about 0.6 ml. (60 percent) of methanol (methanol is slightly soluble in n-heptane). The reaction mixture was cooled and extracted with three 20 ml. portions of 1 N hydrochloric acid. The solid precipitate dissolved in the hydrochloric acid. The hydrochloric acid extracts were combined and washed once with n-heptane. The acid solution was then treated with sodium carbonate (7.5 g. in 75 ml. of water). The basic mixture was extracted with four 25 ml. portions of chloroform. To the aqueous phase was added 20 ml. of 15 percent sodium hydroxide solution and the mixture was then extracted with two 20 ml. portions of chloroform. All the chloroform extracts were combined, washed once with 40 ml. of 7.5 percent of sodium hydroxide solution and then with two 50 ml. portions of water. The chloroform solution was dried over "Drierite." The dried chloroform solution was filtered and the solvent was removed under reduced pressure. The viscous yellow oily residue distilled at 122°–125° C. at $0.8 - 1 \times 10^{-3}$ mm. Hg to give 5.9 g. (74 percent) of the extremely viscous, light yellow oil.

Analysis: Calcd. for $C_{21} H_{31} NO_3$: C, 73.00; H, 9.05; O, 13.89 Found: C, 72.9; H, 9.0; O, 13.9.

EXAMPLE 3

1-Methyl-4-Piperidylmethyl Benzilate

Sodium (1.80 g. 0.08 mole) was dispersed by vigorous stirring in 60 ml. of refluxing dry toluene. The stirred mixture was allowed to cool to room temperature. An anhydrous solution of 22.5 g. (0.09 mole) of methyl benzilate in 200 ml. of warm toluene was then added to the stirred sodium dispersion at room temperature. An immediate reaction resulted as seen by the development of hydrogen gas and the gradual disappearance of the sodium particles. After 2.5 hours, the reaction was complete. During this phase of the reaction, the mixture was cooled by means of a cold water bath to keep the temperature of the mixture below 30° C. The stirred solution was then heated to about 90° C. An anhydrous solution of 7.9 g. (0.06 mole) of 1-methyl-4-hydroxymethylpiperidine in 40 ml. of toluene was added to the reaction mixture and the resulting solution was heated to reflux and allowed to distil slowly. The distillate was removed for a period of 3 hours in an attempt to obtain a vapor temperature of 110° (the vapor temperature of pure toluene). However, the vapor temperature did not rise above 109° and the refluxing was stopped at this point. During this operation, fresh toluene was added occasionally to prevent the reaction mixture from going to dryness. The reaction mixture was then cooled to approximetely 20° C. and extracted with one 200 and four 100 ml. portions of cold 1 N hydrochloric acid. The acid extracts were combined, and made alkaline (pH 12) by the addition of a cold 15 percent sodium hydroxide solution. The alkaline mixture was then extracted with one 200 and four 100 ml. portions of chloroform. The extracts were combined and dried over Drierite. After removing the solvent under reduced pressure, the oily residue was placed in a refrigerator where it crystallized. After several days, the compound was recrystallized from ethylacetate-ligroine (66°–75°) to yield 8.5 g. (42 percent) of the desired colorless product; m.p. 115°–116°.

Analysis: Calcd. for $C_{21}$ $H_{25}$ $NO_3$: C, 74.29; H, 7.42; O, 14.14 Found: C, 74.2; H, 7.5; O, 14.1.

EXAMPLE 4

1-Methyl-4-Piperidylmethyl 9-Hydroxyfluorene-9-Carboxylate Hydrochloride or

1-Methyl-4-Piperidylmethyl Diphenyleneglycolate Hydrochloride

A mixture of 9-hydroxyfluorene-9-carboxylic acid (4.5 g. 0.02 mole), 1-methyl-4-hydroxymethylpiperidine, (2.6 g. 0.02 mole) in 400 ml. of toluene was placed in a three-neck, round-bottom, 1-liter flask, equipped with a magnetic stirrer, thermometer, Dean-Stark water separator, a submerged gas inlet tube, and a condenser. All openings to the atmosphere were protected by calcium chloride drying tubes. While the mixture was being stirred and refluxed, gaseous hydrogen chloride was passed into the reaction for about 20 hours. During this reaction period, water was collected in the water separator. The mixture was cooled to room temperature and the solvent was removed under reduced pressure. Trituration of the oily residue with warm acetone produced the solid product, which was recrystallized several times from a isopropyl alcohol-acetone mixture and finally from ethanol. In this way, there was obtained 3 grams (40 percent) of the white product, m.p. 202°–204° C.

Analysis: Calcd. for $C_{21}$ $H_{23}$ $NO_3$: HCl: C, 67.46; H, 6.47; Cl, 9.48 Found: C, 67.3; H, 6.5; Cl, 9.3.

In a manner similar to the above examples, one can obtain the corresponding 1-ethyl and 1-n-propyl derivatives.

The salts of the above esters are prepared from the free bases by the addition of the appropriate non-toxic organic or inorganic acid to a solution of the free base. These salts and their corresponding bases are useful as incapacitating agents when dispersed as aerosols. The liquid free bases can also be used as percutaneously active materials.

We claim:

1. A member of the group consisting of compounds of the formula:

$$R-N\underset{}{\bigcirc}-CH_2-OOC-\underset{R_2}{\overset{R_1}{C}}-OH$$

and nontoxic acid addition salts thereof, where R is a lower alkyl radical of 1–3 carbon atoms, $R_1$ is taken from the group consisting of the phenyl, cyclopentyl, and cyclohexyl radicals when $R_2$ is the phenyl radical and $R_1$ and $R_2$ taken together are the diphenylene radical.

2. 1-methyl-4-piperidylmethyl diphenylglycolate.
3. 1-methyl-4-piperidylmethyl cyclopentylphenylglycolate.
4. 1-methyl-4-piperidylmethyl cyclohexylphenylglycolate.
5. 1-methyl-4-piperidylmethyl diphenyleneglycolate.
6. 1-methyl-4-piperidylmethyl diphenylglycolate hydrochloride.
7. 1-methyl-4-piperidylmethyl cyclopentylphenylglycolate hydrochloride.
8. 1-methyl-4-piperidylmethyl cyclohexylphenylglycolate hydrochloride.
9. 1-methyl-4-piperidylmethyl diphenyleneglycolate hydrochloride.

* * * * *